United States Patent [19]

Hardwick

[11] 3,955,830

[45] May 11, 1976

[54] FOLDABLE BOAT TRAILER

[76] Inventor: Richard H. Hardwick, 1753 Spring St., Smyrna, Ga. 30080

[22] Filed: Aug. 8, 1974

[21] Appl. No.: 495,552

[52] U.S. Cl. .............................. 280/414 B; 214/373

[51] Int. Cl. ............................................ B60p 3/10

[58] Field of Search...... 280/414 B, 414 R, 47.13 B, 280/38, 39; 214/373, 394, 395, 392

[56] References Cited

UNITED STATES PATENTS

| | | | |
|---|---|---|---|
| 2,594,540 | 4/1952 | Cole et al. | 214/373 |
| 2,603,501 | 7/1952 | Graves | 280/414 B |
| 2,634,010 | 4/1953 | Sass | 214/373 |
| 2,641,373 | 6/1953 | Wright | 280/414 B X |
| 2,970,846 | 2/1961 | Boston | 280/414 A X |

*Primary Examiner*—Leo Friaglia
*Assistant Examiner*—R. Schrecengost

[57] ABSTRACT

A foldable trailer which may be collapsed for easy storage or shipment and which may be used to suspend a boat thereunder for transporting a boat from one location to another. The arrangement of the trailer permits suspension of the boat by one person with minimal effort.

2 Claims, 6 Drawing Figures

FOLDABLE BOAT TRAILER

The present invention relates to a trailer which may be used to transport small boats to and from the water and following usage may be collapsed for storage or shipment. More particularly, the present invention concerns a trailer which is designed to suspend a boat beneath the main structural members of the trailer.

An outstanding disadvantage of boat trailers of conventional construction concerns the fact that in order to load and unload the trailer either several attendants are necessary or the trailer must be driven into the water. In addition, the conventional trailers are cumbersome and complicated and are not easily collapsed for storage or shipment.

It is an object of the present invention to provide a collapsible trailer for small boats enabling one person to load and unload the boat during launching, retrieval and transporting operations.

It is a further object of the present invention to provide a collapsible trailer which may be easily transported manually while loaded with a boat, easily loaded and unloaded manually by one person, and easily collapsed and assembled manually by one person.

Other objects, features and advantages of the present invention will become apparent from a review of the following description of a preferred embodiment and the accompanying drawings wherein like numerals refer to like parts throughout, and in which.

Figure 2:
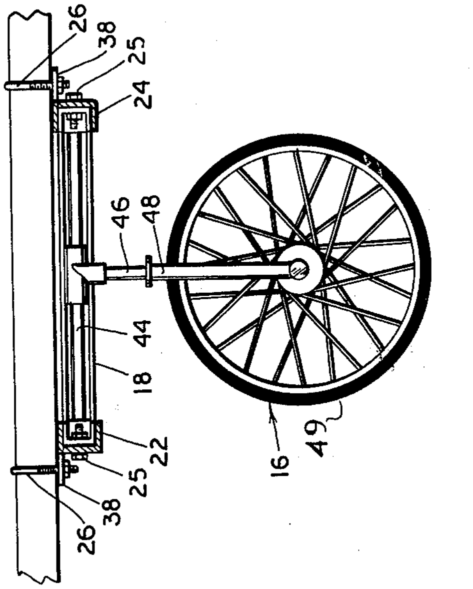
FIG. 2 is a side elevational view with parts in vertical section, taken along lines 2—2 of FIG. 1.
Figure 1:
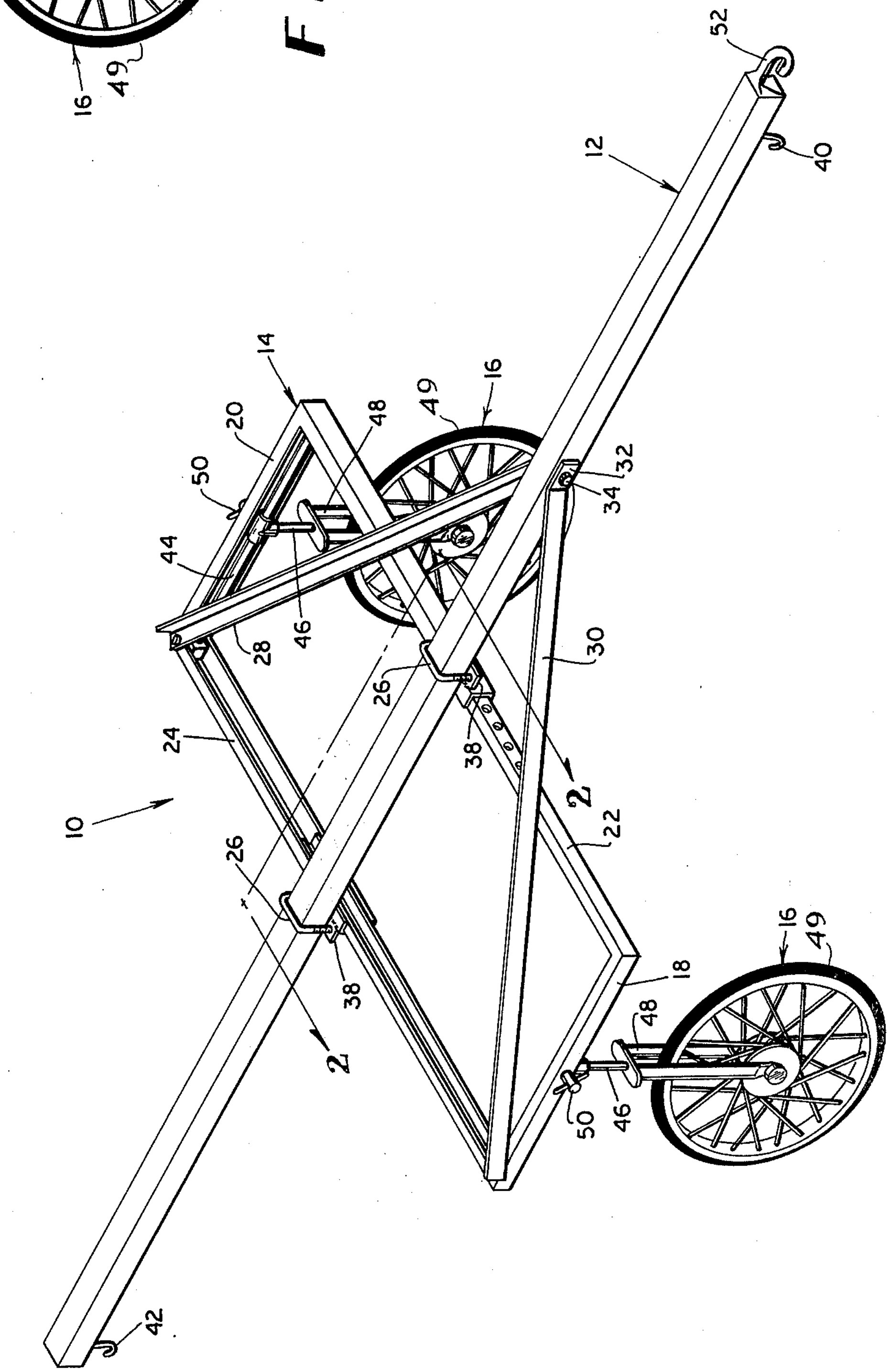
FIG. 1 is a plan view of the trailer of this invention.

Referring now more specifically to the drawings and according to the present invention, it will be understood that the foldable boat trailer 10 of this invention generally includes a boom 12, carriage assembly 14 and wheel assembly 16. Carriage assembly 14 is of generally rectangular shape and includes side rails 18 and 20 and front and rear rails 22 and 24. Front and rear rails are segmented at their approximate mid-point and are constructed to overlap with each other. Holes are cut in each of the overlapping areas of the front and rear rails to align in various positions so that the ultimate length of the front and rear rails may be varied to suit the width of the boat carried by the trailer. By positioning threaded bolts 25 in the aligned holes of the front and rear rails and securing nuts to the bolts, it is possible to fix the length of the rails in a stable configuration after selection of the desirable length for those rails.

Carriage assembly 14 also includes a pair of radius rods 28 and 30 which are fixed for rotation by bolts at the rear corners between rear rail 24 and side rails 18 and 20. Rods 28 and 30 are of a length substantially equal to the maximum length of rear rail 24 so that the rods may be rotated toward and positioned over rear rail 24 for compact storage and transportation. Rods 28 and 30 may also be rotated forwardly to be on either side of boom 12. Rods 28 and 30 terminate at their forward ends in flange sections 32 which contain holes for reception of a bolt. A single threaded bolt 34 may then be passed through the holes in the flange sections of the rods and through an aligned hole in the boom to be fixed in place by a nut.

Boom 12 is also joined to carriage 14 by passage through aligned U-bolts 26 which are removably fixed by nuts to reception plates 38 on the front and rear rails

22 and 24. By tightening the nuts on the U-bolts, the boom may be retained between the U-bolts and plates 38. In this arrangement boom 12 is removably attached to carriage 14 in stable fashion. Boom 12 also includes downwardly extending front and rear hooks 40 and 42. These hooks should be large enough to easily attach to appropriately positioned eyes which are threaded into the front and rear upper surfaces of a small boat.

Carriage 14 also includes a pair of wheel assemblies 16 which are carried in a pivotal arrangement adjacent and parallel to side walls 18 and 20. Wheel assemblies 16 include a horizontal bar 44 which is joined at its ends to front and rear rails 22 and 24 so that the bar may be rotated with respect to those rails. Yoke 46 of the wheel assemblies is fixed to the middle of the bar 44 by a T-fitting. Yoke 46 includes a conventional fork 48 and a wheel 49 rotatably fixed therebetween. Since bar 44 rotates with respect to the front and rear rails, it may be understood that the wheels may be collapsed with respect to the carriage by rotating bar 44 and moving the wheels into a position immediately adjacent the carriage in an overlapping relationship.

In order to fix the wheel assemblies in a vertical position, threaded bolts 50 may be passed through holes in the side rails and through an aligned hole in bars 44 to be secured therein.

A handle 52 may be fixed to the front end of boom 12 so that the trailer may be manually moved from one location to another.

When collapsing the present trailer, the nut is removed from bolt 34 and rods 28 and 30 are disconnected from boom 12. Boom 12 is further disconnected from the carriage by loosening or removal of the nuts from U-bolts 26. After removal of the boom, rods 28 and 30 may be rotated so that they align over rear rail 24. Bolts 50 are then removed from bar 44 and wheel assemblies 16 are pivoted under the carriage and into an adjacent relationship with respect to the carriage. The trailer then presents a very compact and easily stored assembly of two elements, i.e., the boom and the folded carriage.

Figure 3:
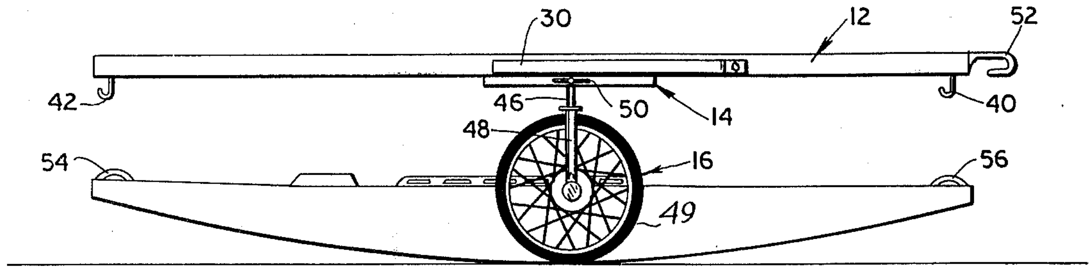
FIGS. 3–6 show the sequence of steps involved in loading a boat to the trailer.
Figure 4:
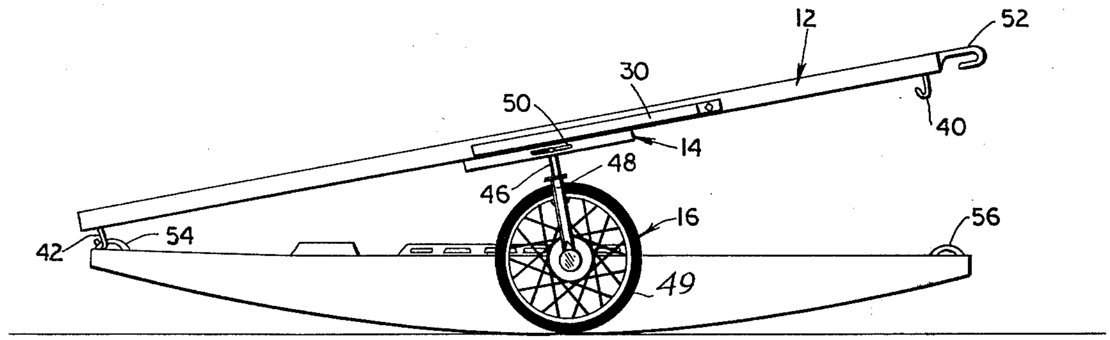
Figure 5:
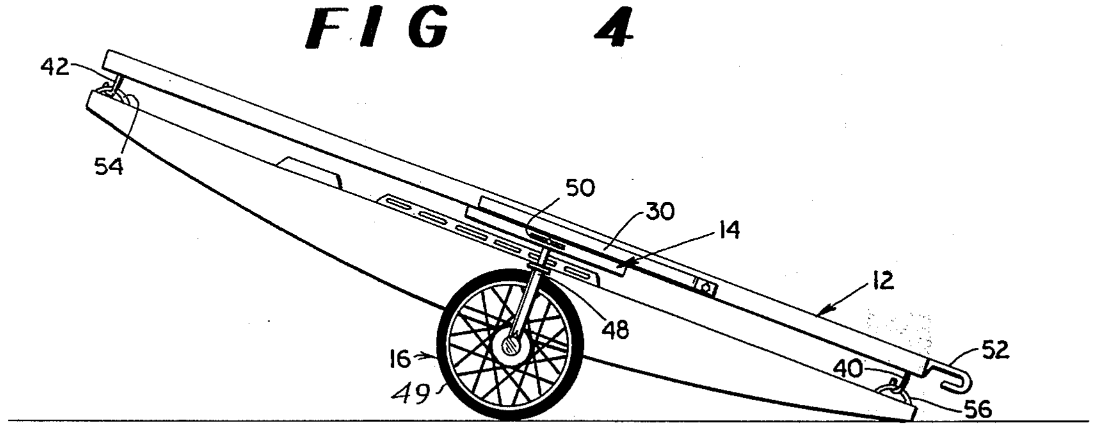
Figure 6:
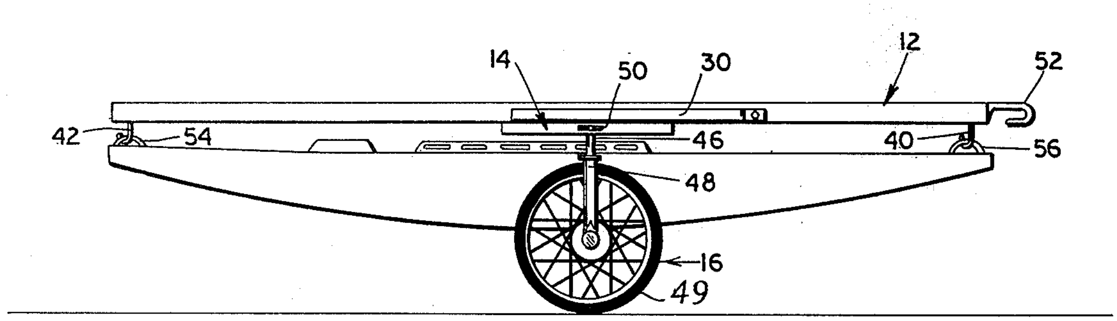

When loading a boat under the trailer, FIG. 3, the trailer is first rolled over the boat so that the bow of the boat resides generally beneath the front hook 40 and the stern of the boat resides generally beneath rear hook 42. The rear hook of the trailer is then engaged into eye 54 on the stern of the boat by moving the rear portion of boom 12 downwardly until hook 42 easily engages eye 54. The front hook 40 is then engaged into eye 56 by moving the front portion of boom 12 downwardly until the hook engages the eye. It will be seen that movement of the boom downwardly in this fashion may be easily accomplished because the boom will function as a lever in this operation pivoting around the wheels 49. After engaging front hook 40, the boom is released, and the boat is elevated beneath the trailer for easy movement to another location. By reversing the steps for loading the boat, it may be seen that it is possible to unload the boat. In this fashion, it is quite convenient for one person to load, unload and transport a small boat with very little difficulty.

The carriage and boom of the present invention may be constructed of several materials such as steel, aluminum or other lightweight metal, wood or plastic. It should be understood that other similar materials may be used in the construction of the present foldable boat trailer.

Wheels 49 are shown in the drawing as inflated tires mounted on spoke supported rims. It should be understood that these wheels may also be solid rubber or constructed of other similar materials so long as they function as disclosed in this application.

While this invention has been described in detail, with particular reference to preferred embodiments thereof, it will be understood that variations and modifications can be effected within the spirit and scope of the invention as described in the appended claims.

I claim:

1. Foldable boat trailer comprising a carriage of sufficient width to cradle and support a boat extending thereunder, a pair of supporting wheels each pivotally mounted to said carriage for pivotal movement with respect to said carriage from a folded horizontal position adjacent the carriage to a vertical position and an elongate boom carried by said carriage for supporting the bow and stern of a boat from beneath the front and rear portion of said boom.

2. Foldable boat trailer of claim 1 wherein said boom is removably connected to said carriage and the carriage includes a pair of rods which are attached at one end of each rod to the carriage and the other end of each rod to the boom.

* * * * *